(12) United States Patent
Solomon

(10) Patent No.: US 8,395,682 B2
(45) Date of Patent: Mar. 12, 2013

(54) SYSTEM AND METHODS FOR IMAGE DEPTH-OF-FIELD MODULATION

(76) Inventor: Neal Solomon, Oakland, CA (US)

( * ) Notice: Subject to any disclaimer, the term of this patent is extended or adjusted under 35 U.S.C. 154(b) by 0 days.

(21) Appl. No.: 12/932,867

(22) Filed: Mar. 8, 2011

(65) Prior Publication Data

US 2012/0229674 A1    Sep. 13, 2012

(51) Int. Cl.
*H04N 5/76*    (2006.01)
*H04N 5/225*    (2006.01)

(52) U.S. Cl. .................... 348/231.99; 348/340

(58) Field of Classification Search ............... 348/231.9, 348/222.1, 241, 252, 234, 235, 207.1; 382/167, 382/274, 293, 162, 163
See application file for complete search history.

(56) References Cited

U.S. PATENT DOCUMENTS

2008/0174678 A1*    7/2008    Solomon .................. 348/231.99

\* cited by examiner

*Primary Examiner* — Roberto Velez
*Assistant Examiner* — Stephen Coleman

(57) ABSTRACT

A digital imaging system is described that controls and manages depth-of-field (DOF) modulation processes in camera. The camera CPU and DSP are used to modulate the DOF by using feedback from the scene and user preferences. The camera CPU sends a signal to the lens CPU to modify the lens aperture to control DOF to satisfy user preferences.

20 Claims, 14 Drawing Sheets

FIG. 3 - A
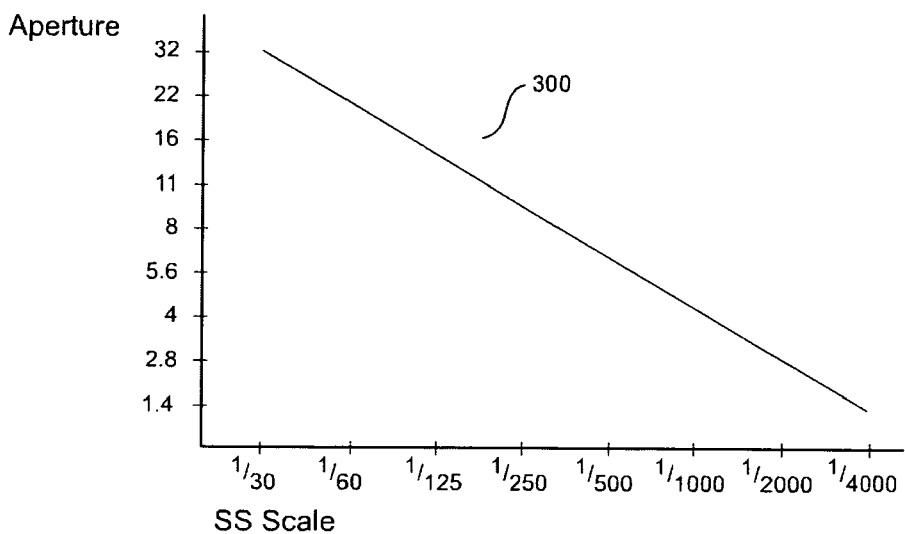
FIG. 3 - B
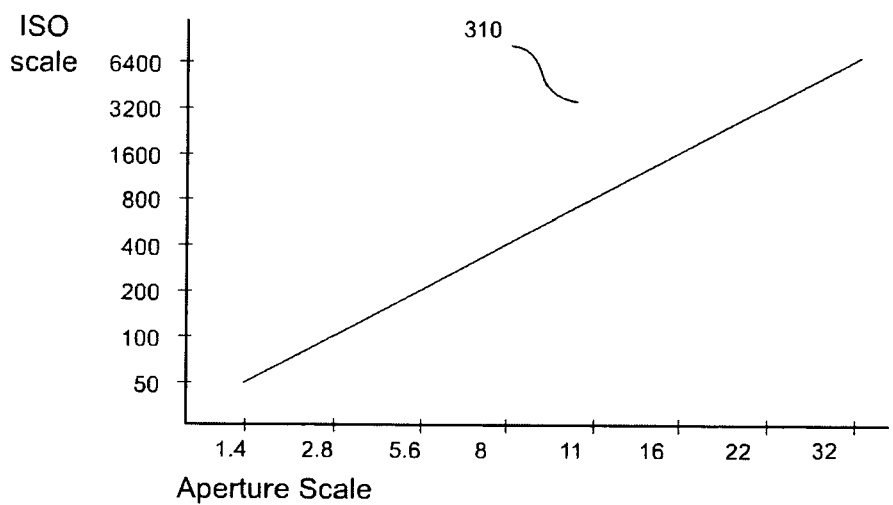
FIG. 3 - C
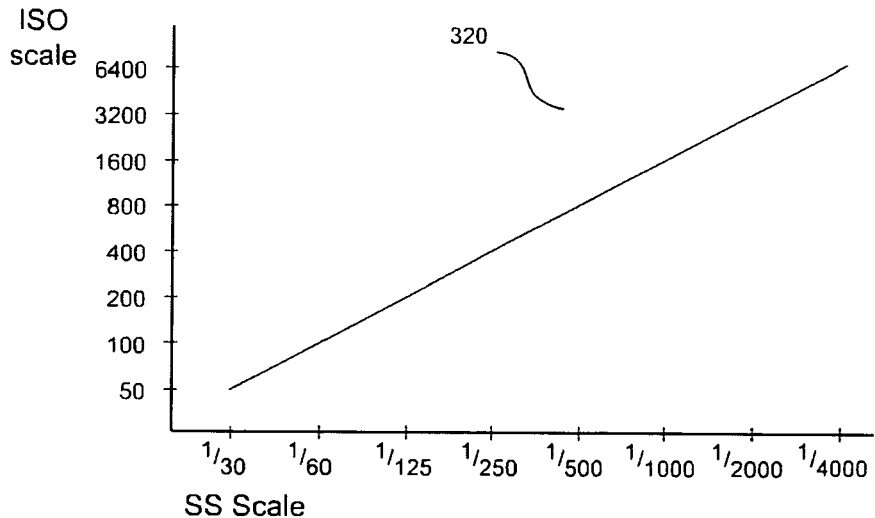

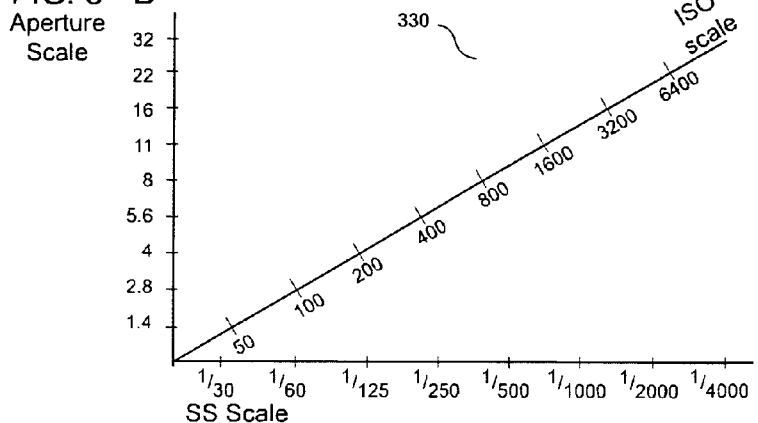
FIG. 3 - D
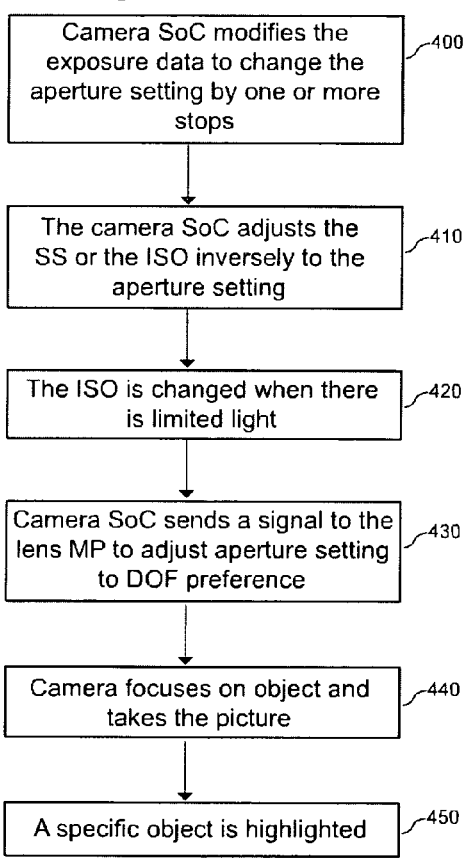
FIG. 4
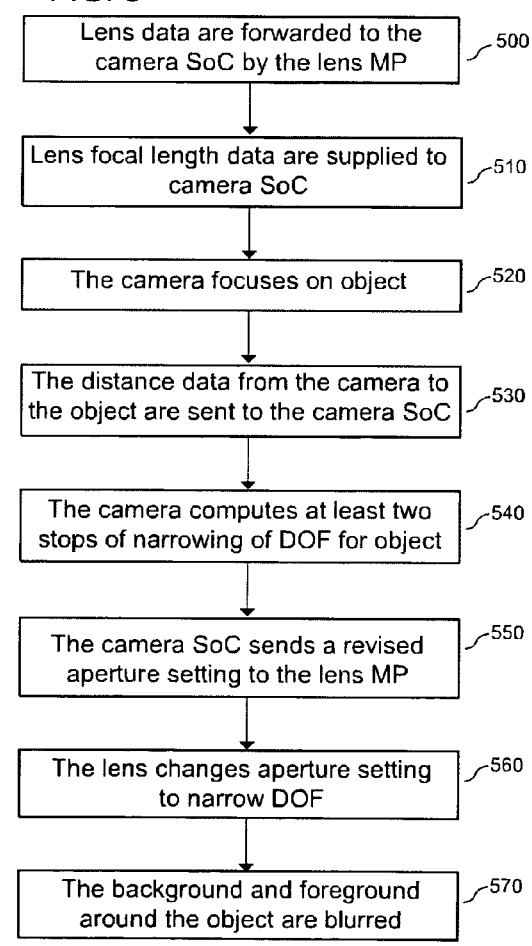
FIG. 5

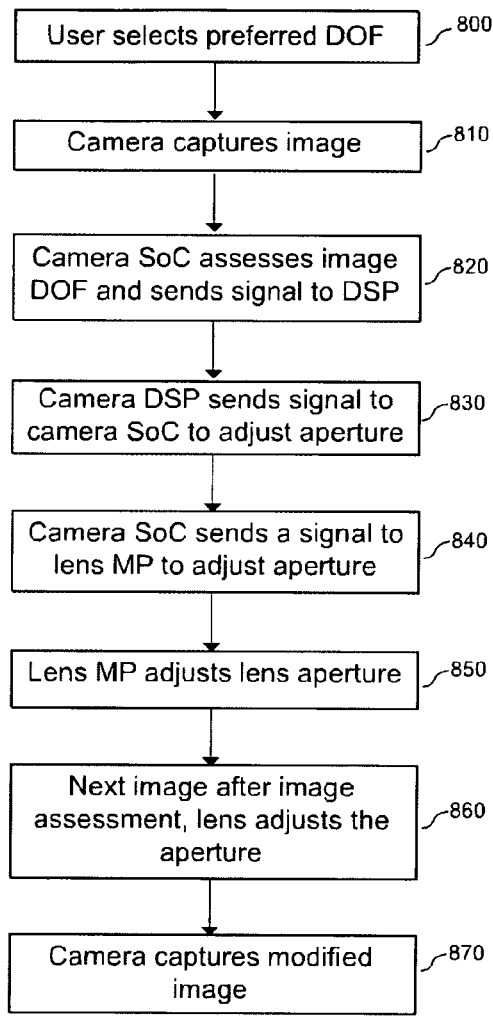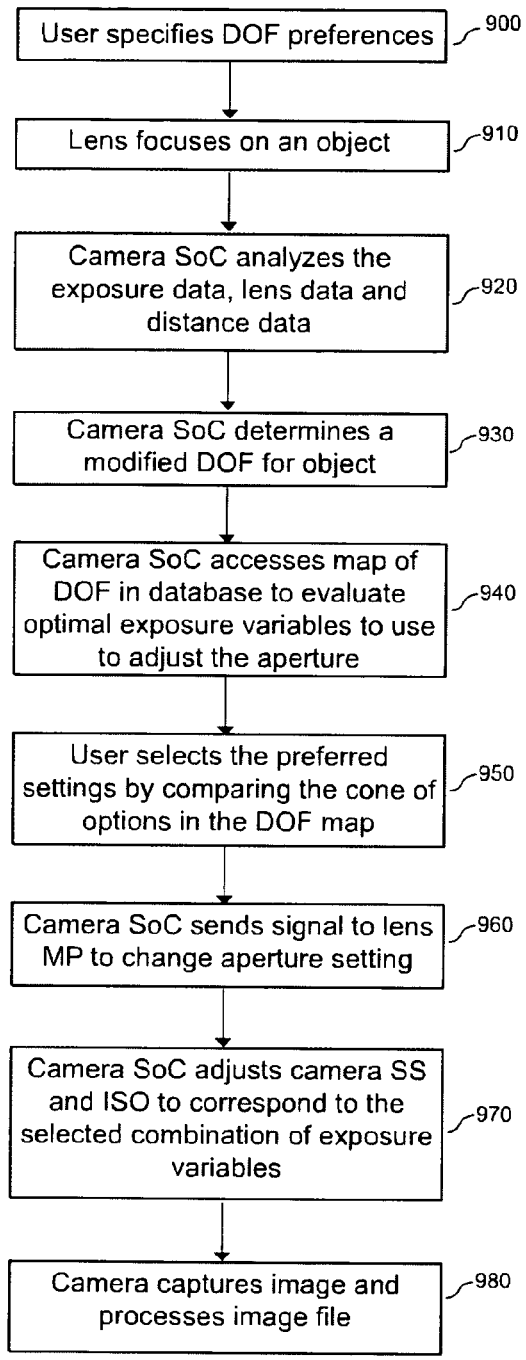

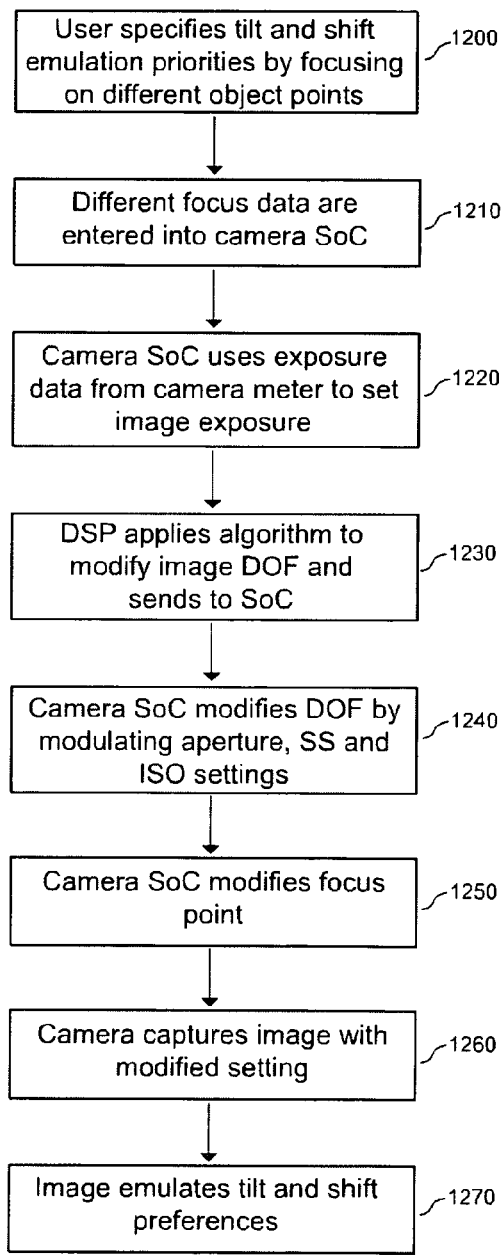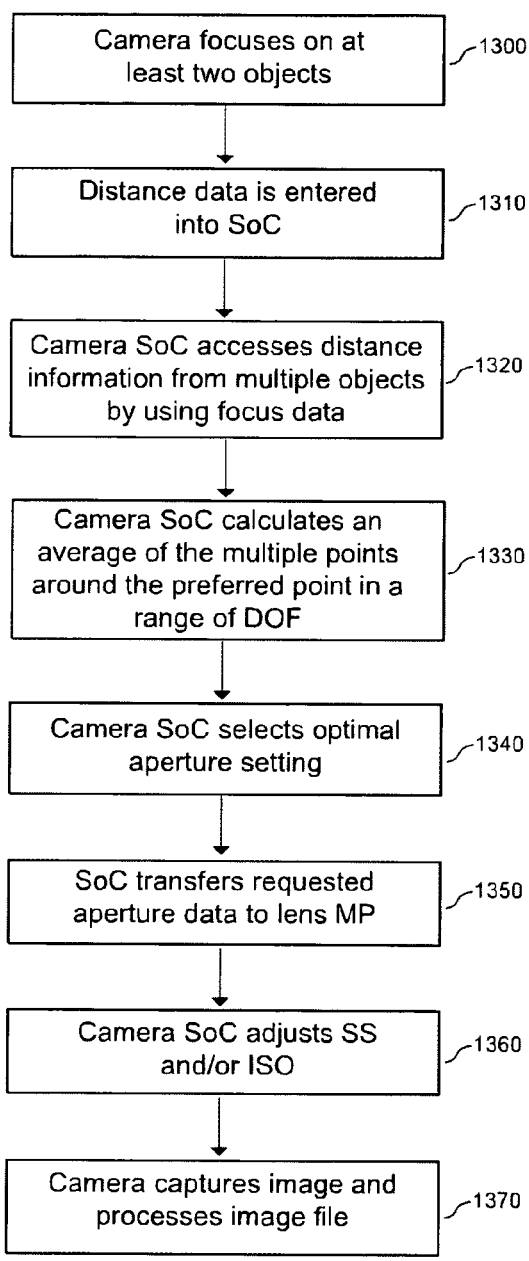

SYSTEM AND METHODS FOR IMAGE DEPTH-OF-FIELD MODULATION

CROSS-REFERENCES TO RELATED APPLICATIONS

The present application claims the benefit of priority under 35 U.S.C. §119 from U.S. Provisional Patent Application Ser. No. 61/338,771, filed Mar. 9, 2010, the disclosure of which is hereby incorporated by reference in their entirety for all purposes.

FIELD OF THE INVENTION

The invention pertains to optical image capture and management of depth-of-field in still and video images. The system involves both still objects and moving objects.

BACKGROUND OF THE INVENTION

A digital camera consists of an optical component, a digital sensor component, image processing circuitry, camera system circuitry, and a file storage component. Each of these component types have undergone, and continue to undergo, evolution. A problem that emerges is the issue of obsolescence. As each component in a camera system is updated, the overall system becomes obsolete, much like a computer. This constant updating and obsolescence forces users to upgrade to newer camera technology every few years.

The history of digital imaging is a story of filtration solutions to optical and digital aberrations. To solve these image aberrations, engineers have used integrated circuits and software techniques to address specific problems. For example, aliasing and moiré effects have been solved by applying anti-aliasing and low-pass filters that contain complex software algorithms. Further, the problem of optical aberrations, such as vignetting, pin cushioning and chromatic aberrations, are filtered by applying digital solutions. The need to improve these solutions forces the camera circuitry to be upgraded periodically, which creates the problem of obsolescence.

As camera elements have gotten smaller and more efficient, cameras have become ubiquitous. It is common to find camera components embedded in wireless phones and devices (PDAs), tablets and mobile computers. Not only are these optical systems able to process still digital images, but they are also able to capture, process, filter and manage digital video images. The problem remains, however, whether in digital cameras, digital video cameras or wireless devices with camera components, that the quality of the image produced is often poor. The smaller and cheaper the digital camera, digital video camera or digital optical device, the more problematic the image quality becomes.

So far, the idea of the digital camera has been limited to a device which contains integrated optical components, a sensor component, digital image signal processing circuitry, digital image filtration circuitry and digital file storage circuitry. However, each of these integrated components may be improved upon in a modular way and disintegrated in successor upgraded imaging devices.

It is possible to use digital imaging technologies to improve digital image problems such as optical and digital aberrations. Solomon (U.S. Pat. No. 7,612,805) has developed a digital imaging system for filtration to improve optical and digital aberrations created by lens and sensor constraints. Specific digital imaging filtration techniques are available as algorithms applied to specific imaging problems.

In addition to providing filtration, digital imaging provides the opportunity to manipulate the image to user preferences. For example, it is possible to manipulate depth of field in digital images by controlling lens aperture.

The digitalization of images further allows digital files to be transmitted on computer networks for storage. Shutterfly has developed a business model based on the storage and management of digital images on computer network servers and databases for photo sharing.

The dominant model for advanced digital photography is the digital single lens reflex (D-SLR) camera. In the main, most D-SLR cameras are organized to work within one paradigm. Film-based SLR cameras operate by using a lens apparatus connected to a camera body. When a shutter button is depressed, a microprocessor in the camera activates a shutter in the camera and an aperture in the lens to capture light onto a plane of film after a mirror flips up exposing the film. The silver-halide-based film is then chemically developed and images are preserved.

In a D-SLR, when the shutter button is depressed, a microprocessor (or SoC) in the camera activates a shutter in the camera and an aperture in the lens to capture light onto a digital sensor after a mirror flips up exposing the digital sensor. The sensor is typically either a charge coupled device (CCD) or a complementary metal-oxide semiconductor (CMOS) circuit that converts light to electrons. Once the sensor is exposed to light from the lens, camera circuitry moves the data from the sensor to a digital signal processor (DSP). The DSP performs a set of functions that filter the digital image file and transfers the converted data file to camera circuitry that stores and displays the corrected image file. A microprocessor (or SoC), which accesses a database in the camera, controls the image exposure settings, the internal camera circuitry and the mechanical operations of the shutter. In some cases, the camera microprocessor circuitry provides feedback to a microprocessor in the lens in order to measure and control the lens aperture and to synchronize exposure information between the lens aperture and the camera shutter. The user is able to manipulate the lens aperture, the camera shutter speed, the camera ISO speed, the data compression rate, and, in some cases, artificial light (such as a flash). The camera circuitry converts an analog image to digital format and converts the digital file to an analog image for presentation.

When any of these digital camera components can be improved, it is unfortunately necessary to upgrade the entire camera system. This process of upgrading a camera is costly and inefficient for the user. What is needed is a modular system that is able to upgrade different camera components independently.

SUMMARY OF THE INVENTION

Specific objects are typically the main component of many images. Highlighting these objects against an image's background is a major focus of portraiture. More than the emphasis of focusing on an object, the main idea of highlighting an object in the foreground against a blurred background requires using a limited depth of field (DOF) around the main object. This DOF limitation is achieved by reducing the lens aperture setting to a lower f-stop setting so as to increase light access. With relatively reduced aperture, the main object is highlighted and the other objects and background are de-emphasized by remaining relatively out of focus. However, rather than assume a fixed minimum aperture for each image, the range of aperture settings is flexible. Further, each lens type and focal length—because of each lens's distinctive field of view—requires a different aperture range to achieve a specific DOF. Finally, the distance from the camera is a crucial data set to use in manipulating DOF in an image.

The present system provides a set of DOF modulation options for photographers to optimize imaging. From offering methods to modulate specific objects in an image to modulating multiple objects, moving objects and objects in artificial light, the present invention offers insight into manipulating exposure variables in order to obtain optimal DOF image results.

The challenges presented here, then, include (a) how to modify DOF by adjusting aperture, shutter, ISO (and flash) using feedback mechanisms of a digital camera, and (b) how to how to optimize a digital video image.

Development of the present modular multi-functional digital imaging system results from understanding the limits of digital photography. While digital cameras have evolved in the last few years to include intra-camera computer circuitry for digital image processing, there are significant limits to all aspects of the in-camera components. First, the digital sensor has size and precision constraints. Second, the camera (and lens) electronic circuitry (MPs, ASICs and DSPs) have processing constraints. Third, as the camera sensor size increases, the digital image file size correspondingly increases, posing substantial storage limits on the internal camera processing and storage components. Because of the increase in data set and file size, the camera circuitry has limits of multi-tasking. With increased file size also comes a limit in in-camera feedback, which slows down the imaging process. While camera manufacturers can invest in faster chips, this increases the cost of the camera, which further exacerbates the obsolescence problem. Though digital photography has a number of advantages over film photography, there are constraints inherent in the evolution of digital imaging technologies.

Digital imaging has become ubiquitous in recent years. Consequently, the present invention applies to a range of imaging technologies. The imaging devices and systems to which the present invention applies include all digital cameras and digital video cameras. These camera devices include cell phones, PDAs, telephones, video camcorders, digital video cameras, digital SLRs, laptops, netbooks, tablet computers and video teleconferencing systems. The system also applies to medical diagnostics, sensor networks, satellite imaging systems, printers and copiers.

The present system solves a range of imaging multi-objective optimization problems (MOOPs). For example, the system modulates shutter speed, aperture and ISO (and flash) to optimize DOF. Also, the system modulates exposure, zoom and video. DSPs and image processing circuitry are optimized to solve each type of MOOP.

The present invention provides a set of advances to the field of digital imaging.

Novelties of the Invention

The present system allows the photographer to manipulate the image DOF in camera. The image DOF is optimized by modulating the aperture, the shutter speed, the ISO and/or the artificial illumination. The present system allows the user to manipulate DOF of objects, including moving objects, in a still image and in video images. The system also presents a method to manipulate DOF in a video image with zoom lenses.

Advantages of the Invention

The invention allows objects in still and video images to be highlighted by manipulating DOF. The ability to manipulate DOF in an image allows the user to maintain maximum control in an image. The present system allows the photographer to improve image quality substantially.

LIST OF ABBREVIATIONS

ASIC, application specific integrated circuit
CCD, charge coupled device
CMOS, complementary metal oxide semiconductor
CRT, cathode ray tube
DCT, discrete cosign transform
DOF, depth of field
D-SLR, digital single lens reflex (camera)
DSP, digital signal processor
DVI, digital video imaging
EPCA, exposure priority camera activation
FPGA, field programmable gate array
FFT, fast Fourier transform
LCD, liquid crystal display
LED, light emitting diode
MOOP, multi-objective optimization problem
MP, Microprocessor
OLED, organic light emitting diode
OPCA, object priority camera activation
PDA, personal digital assistant
RGB, red green blue
SDI, still digital image
SoC, system on chip

DESCRIPTION OF THE MAIN EMBODIMENTS OF THE INVENTION (1) Method for Aperture Modulation of Digital Image Image exposure optimization requires modulating aperture in a lens and shutter speed and ISO in a camera. While aperture is the primary variable used to modulate DOF in an image, the other variables are affected by the relative aperture adjustment. Modulating the DOF in an image therefore requires solving a multi-objective optimization problem involving the variables of the aperture, the shutter speed, the ISO, the distance from the camera, the type of lens (that is, its field of view) and the focus on a specific point in the scene. As each of these variables changes, the image captured varies as well.

Most modern cameras use a broad range of aperture and shutter speed combinations to achieve an average image exposure without regard to DOF. Landscapes are shot with high aperture for broad DOF and portraits are shot with limited aperture for narrow DOF. In order to change the image parameters of an average exposure, if one adjusts the shutter speed one stop, then the aperture is inversely adjusted one stop. There is a trade-off that is represented by a specific slope that correlates the aperture setting and the shutter speed setting. If one requires the aperture to adjust one or more stops in natural light without the shutter speed to be adjusted inversely as well, it is necessary to adjust the ISO by one or more stops to inversely correlate with the aperture adjustment. In some cases, an adjustment of both shutter speed and ISO is required to modulate the aperture in some lighting situations.

In the present invention, the DOF in an image is modulated by using the camera microprocessor or SoC to analyze the scene exposure and to specify the degree of emphasis of DOF modification on a specific object. When the microprocessor or SoC modifies the average exposure information to change the aperture setting by one or more stops, it either adjusts the shutter speed or the ISO inversely to accommodate the change. When there is limited light, the ISO is changed and not the shutter speed. The camera microprocessor or SoC sends a signal to the lens microprocessor to adjust the aperture setting in the lens to accommodate the DOF preference. The camera focuses on an object and takes the picture. The image is processed normally. The effect of the aperture adjustment on the image is to highlight a specific object. This process of modulating the DOF is an aperture optimizer. The process creates a window of optimal DOF to solve a specific optimization problem.

In order to perform this set of calculations to achieve the optimal DOF for a specific scene, the lens data are forwarded to the camera microprocessor or SoC. Specifically, the lens type, focal length and field of view data are sent to the camera microprocessor or SoC. For example, since a wide angle lens presents a flatter field of view than a telephoto, the wide angle lens requires less depth of field in order to achieve a highlight of a subject. Not only is the lens focal length a critical data point, but the distance of the main object from the camera is important as well. With the present system, the camera computes a two or more stop narrowing of DOF in order to incur the effect of a blurred background (and/or foreground) so as to highlight the background (and/or foreground).

Since, in natural lighting situations, the light constantly changes, the modulation of the aperture occurs in real time. The camera microprocessor or SoC continually computes the DOF modulation by reading the exposure data from the lens and providing feedback to the lens microprocessor to change the aperture setting to conform to the user's preferred DOF for a particular scene.

In one embodiment of the invention, the DSP performs the adjustment to the original image to modify the aperture setting and thereby modulates the DOF based on the lens focus on a specific object. In order to perform this function, the DSP sends a signal to the lens microprocessor (via the camera MP or SoC) to change the aperture setting. On the next image after the lens aperture setting is assessed, the lens adjusts the aperture and the camera processes the digital file.

The user is able to adjust DOF variables to conform to their preferences. In effect, the user selects a set of DOF options to organize the aperture priority selections within a cone of exposure variables. This approach differs from aperture priority in-camera programs.

(2) Method for Object-Based Digital Image DOF Optimization

The main subject of a portrait is the object of focus in an image. To optimize the portrait, the main object rests at a specific distance from the camera and has a range of DOF around the object. With the lens focused on the main object, the resulting image has a clear main object with complete focus on the object, while the objects around the main object and the background and foreground are out of focus or blurred. The main object is therefore the center of the image as well as the main basis of image and exposure analysis.

The present invention develops a method for object based DOF to modulate the range of the field around a specific object in the scene. In this method, the lens focuses on the object and DOF is limited around the object. The camera microprocessor or SoC analyzes the exposure data, the lens focal length and the distance of the camera from the object with the lens focus on a point of a specific object and determines that a narrower or broader depth of field is required to satisfy a user DOF specification. The camera microprocessor or SoC accesses a map of DOF in the database to evaluate the optimal exposure variables to use to adjust the aperture. The user selects the preferred settings by comparing the cone of options in the DOF map. The camera microprocessor or SoC sends a signal to the lens microprocessor to change the aperture setting to correspond to the DOF preference. The camera microprocessor or SoC then adjusts the camera shutter speed and ISO to correspond to the selected combination of exposure variables. The camera takes the picture and processes the image file normally.

In an embodiment of the invention, in order to optimize DOF in an object, the camera performs "DOF loading" in which the camera microprocessor or SoC calculates at least two stops more DOF than the ordinary exposure. The camera microprocessor identifies the ordinary exposure, adds at least two stops to the aperture setting and compensates for the at least two stops by limiting the shutter speed and/or ISO. The camera microprocessor or SoC sends a signal to the lens microprocessor to modify its aperture setting corresponding to its DOF loading setting. The camera takes the photograph and the DSP, during or after initial capture, processes the image file by narrowing the range of DOF around the main object by applying an algorithm that blurs out the space in the region around the object. The DSP performs this blur effect function by aliasing the points around the main object. The DSP emulates the DOF contiguous blur from the range around the object to the background and foreground. DOF loading, by providing surplus DOF, allows later image filtration and manipulation by the DSP.

In another embodiment, the lens aperture is changed from image to image as the photographer takes several images in sequence. The user selects a function to "bracket" the DOF modulation function and the camera microprocessor or SoC adjusts the lens microprocessor aperture data and the camera shutter and ISO setting to correspond to the user preferences in several image frames.

In an additional embodiment, the camera performs a "shift focus" process that the DOF modulation solves. In tilt-and-shift lenses, which emulate large format camera movements, out-of-focus parts of an image are modified by a DSP by applying an algorithm. The depth of field location of modulation is modified by changing the aperture and/or ISO factors within the limits of user preferences.

(3) Method for Modulating DOF for Multiple Objects in Digital Image

Analyzing the optimal DOF for a single object is performed by identifying the lens focal length, distance from the camera and relative aperture. Analyzing the optimal DOF for multiple objects requires assessing the preference of the main object(s) and calculating the distance between objects in the scene. When one main object is the point of focus in the image, the DOF is a range around the main object. When more than one object is involved in balancing the objects in a range of DOF, a point between the objects is required to be the focus on the scene. In this case, the DOF is modulated at a point in a range between the multiple objects.

To perform the DOF modulation required to accommodate multiple objects in a scene, the camera microprocessor or SoC assesses distance information from multiple objects by using the focus data. As the camera focuses on each object, it enters the distance data to the camera microprocessor or SoC. The distance information from multiple points is analyzed by the camera microprocessor, which calculates an average of the multiple points around the preferred point in a range of DOF. The camera microprocessor (or SoC) then selects the optimal aperture setting and transfers the requested aperture data to the lens microprocessor to adjust the aperture. Once the aperture data is selected, the camera microprocessor (or SoC) adjusts shutter speed and, possibly, the ISO. The camera then takes a picture and processes the image.

The image with multiple objects is analyzed on a matrix pattern that assesses a range of depth of field from minimal distance from the camera to infinity. The depth scale is modulated when objects on the matrix are averaged in relation to the distance from the camera, the lens focal length and the relative aperture required to achieve optimal DOF. In general, with multiple objects, the cone of DOF is increased to accommodate the additional objects.

(4) Method for Modulating DOF in Moving Object in Digital Image

While a still object presents DOF optimization challenges for photographers, modulating the DOF for a moving object is particularly complex. Tracking a moving object requires a continual shift of focus and distance data. The camera microprocessor (or SoC) continually re-computes the distance data in relation to the lens focal length in order to obtain an optimal DOF that balances aperture, shutter speed and ISO.

As the object moves to different positions across the matrix on the plane from the camera to infinity, the camera microprocessor or SoC re-computes the value of the optimal DOF. The camera microprocessor or SoC tracks distance information as the object moves in an irregular pattern. In order to track the object, the camera microprocessor or SoC uses algorithms to anticipate the direction, vector and speed of the object. Object tracking algorithms accelerate the DOF modulation calculations as the object moves within the contiguous space of the scene. The changing object distance data become a major variable in calculating solutions to the DOF optimization problem.

Once the distance data is calculated at a point in time when the camera is activated, the camera microprocessor or SoC sends a signal of preferred aperture to the lens microprocessor to change the aperture setting to correspond to the optimal DOF of the moving object. The image is captured and the image file is processed normally.

In an embodiment of the invention, multiple moving objects are analyzed by comparing the distances between the objects across the matrix on the plane from the camera to infinity. The camera microprocessor or SoC analyzes the average distance between the objects and calculates the optimal DOF for this average distance. The camera microprocessor or SoC sends aperture data to the lens microprocessor, which changes the aperture setting to solve the DOF optimization problem for the multiple moving objects. The camera takes the picture and processes the image file normally.

In all cases, the optimum DOF values change to correspond to the changing information of the moving object(s).

(5) Method for Modulating Moving Object DOF in Digital Video Imaging Process

The analysis of a moving object for DOF modulation is performed by digital video imaging systems. As objects move in different directions, the video camera captures multiple images to track their movement. While in a still camera, the DOF modulation of a moving object, or moving objects, is performed by tracking the distance from the lens, and the change of distance as the object moves relative to an axis from the camera to infinity, in a video camera, this process is performed by continuously tracking moving objects.

The present method for continuously modulating the moving object DOF in digital video imaging involves using the camera microprocessor or SoC for calculating an evolutionary multi-objective optimization problem.

In the case of video, more than one object may be tracked simultaneously. One object may be the main subject at one moment while another object is the main subject the next. In this sense, there is a hand-off of objects in the video context that requires a continual modulation of DOF. Data on the relative objects are continually input in the camera microprocessor or SoC, which analyzes the object trajectories, vectors and velocity. These data points are used to calculate DOF changes as the distance of the objects changes relative to the camera. The focal length of each lens setting is a critical factor in the continuous moving object DOF calculation.

In the case of video, because the exposure data is limited, while the aperture is modulated to conform to optimal DOF preferences, the ISO is preferred for adjustment rather than the shutter speed.

The camera microprocessor or SoC uses algorithms to track specific objects in order to anticipate their trajectories and rates of motion so as to accelerate the DOF modulation calculation.

In one embodiment of the invention, the image field is split into quadrants. As objects move from quadrant to quadrant, the camera microprocessor tracks their motion efficiently.

(6) Method for Reorganizing DOF of Moving-Object with Zoom Lens Modulation

With a zoom lens, modulation of DOF data is complicated as the lens focal length data change. In this case, the calculation by the camera microprocessor or SoC uses changed focal length data to analyze the moving object relative to the lens position and field of view at a specific time.

The camera microprocessor or SoC tracks the object along the axis of the plane from the camera to infinity and calculates the optimal DOF. The camera microprocessor or SoC adjusts the aperture to optimize the range of the DOF to correspond to the selection of a specific lens focal length and field of view. The camera microprocessor or SoC adjusts the camera shutter speed and ISO as required to modulate the DOF for at least two different lens focal lengths and sends the data to the lens microprocessor, which adjusts the aperture setting to conform to the DOF solution at a specific time. The user takes the picture and the camera processes the image file normally. As the zoom lens changes focal length position, its optimal DOF data are changed and the revised aperture data sent to the lens for a new image and so on.

When two or more objects are tracked using a zoom lens, the distance data for the objects are averaged and computed relative to the changing lens focal length and field of view. The revised distance data are then used by the camera microprocessor or SoC to calculate aperture settings to optimize DOF to conform to user preference and the aperture data are sent to the lens microprocessor to change the aperture setting. The camera takes the picture and processes the image file normally.

When two or more objects are continuously tracked using a zoom lens in a video camera, the lens data and the objects' data are continually changing. In this case, the camera microprocessor or SoC calculates, and averages, the relative trajectories of the moving objects, and the changing lens focal length data in order to analyze the optimal DOF. The camera microprocessor or SoC selects an aperture based on the preferred range of DOF for a specific set of objects and adjusts the ISO (and shutter speed) in order to obtain the optimal DOF. The camera microprocessor or SoC sends aperture data to the lens microprocessor, which changes the lens aperture setting. The camera takes the pictures and processes the images normally.

The video camera constantly recalculates the optimal DOF to conform to the changed positions of the objects and the zoom lens focal lengths as the camera is operational. The camera is continuously solving evolutionary multi-objective optimization problems in order to develop DOF solutions.

(7) Method for Modulating DOF with Flash

While natural light image exposure calculations require using a trade-off of image variables of aperture, shutter speed and ISO, the ability to add artificial light changes the calculation appreciably. In the use of artificial light synchronized to the camera, the aperture, shutter speed and ISO settings are able to be modified with far more flexibility. Instead of modulating the aperture, the artificial light can be increased or decreased relative to fixed aperture, shutter speed and ISO. The flash and aperture settings trade-off to provide the object an optimal DOF.

In the present invention, the use of flash provides an additional variable to manipulate DOF. Rather than modifying the aperture, shutter speed or ISO settings, the amount of flash is modulated. To obtain less depth of field, less flash is used, while to obtain more depth of field, more flash is used. The use of flash allows the camera to compensate for aperture. The use of flash also has the effect of not only lighting the main subject but substantially darkening the background.

After the camera identifies an object distance from focus data and the camera microprocessor or SoC assesses the optimal DOF for an object, it calculates the degree of flash, the aperture setting and the shutter speed (with a constant ISO) for each particular lens focal length. The aperture data are then sent to the lens microprocessor, which adjusts the aperture setting. The user takes the picture and the camera processes the image normally.

This process is used to calculate the DOF optimal range for multiple objects, for moving objects, for video imaging and for zoom lenses (as they shift from one focal length to another).

(8) Method for Post-Capture Digital Image DOF Re-Computation in DSP

The present system uses a method to re-compute DOF information after image capture. The original image requires processing the image with extra DOF by at least two stops. In this case, after the image is captured and stored, the image file is moved from storage to a DSP for analysis. The image DOF is narrowed by the DSP by blurring the image components around the main object. The DSP uses the distance data of the objects to estimate the relative distance in the range of the preferred DOF. The DSP then uses filtration to blur the image data in a field outwards from the main object by aliasing parts of the image to simulate the range of the DOF around the main object.

In an embodiment of the invention, the camera captures the image by using the DOF modulation processes. The camera microprocessor or SoC analyzes the object (or objects') DOF and provides solutions to DOF optimization problems that correspond to user preferences. The camera then recommends a further change of DOF for future images of the object given the same image exposure variables, distance data and lens field of view data. The camera microprocessor or SoC sends the recommended aperture data to the lens microprocessor, which changes the lens aperture setting. The camera takes a picture with the new aperture data, and changes the shutter speed, ISO and flash data correspondingly to accommodate the DOF preferences. Subsequent images contain DOF modulation that is then processed normally.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

DESCRIPTION OF THE DRAWINGS

FIGS. 3A to 3D are tables showing the slopes of aperture, shutter speed and ISO variables.

FIG. 4 is a flow chart showing the process of using the camera SoC to modify lens aperture to optimize image DOF.

FIG. 5 is a flow chart showing the process of optimizing DOF of an object in an image using a digital camera.

FIG. 8 is a flow chart showing the process of using a camera SoC to modify image DOF in successive images.

FIG. 9 is a flow chart showing the process of using a camera SoC to optimize image DOF by manipulating SS and ISO.

FIG. 12 is a flow chart showing the process of using a camera SoC to modify image DOF by modulating aperture, SS and ISO to emulate tilt and shift.

FIG. 13 is a flow chart showing the process of using the camera SoC to modulate DOF of an image involving at least two objects.

DETAILED DESCRIPTION OF THE DRAWINGS

Figure 1:
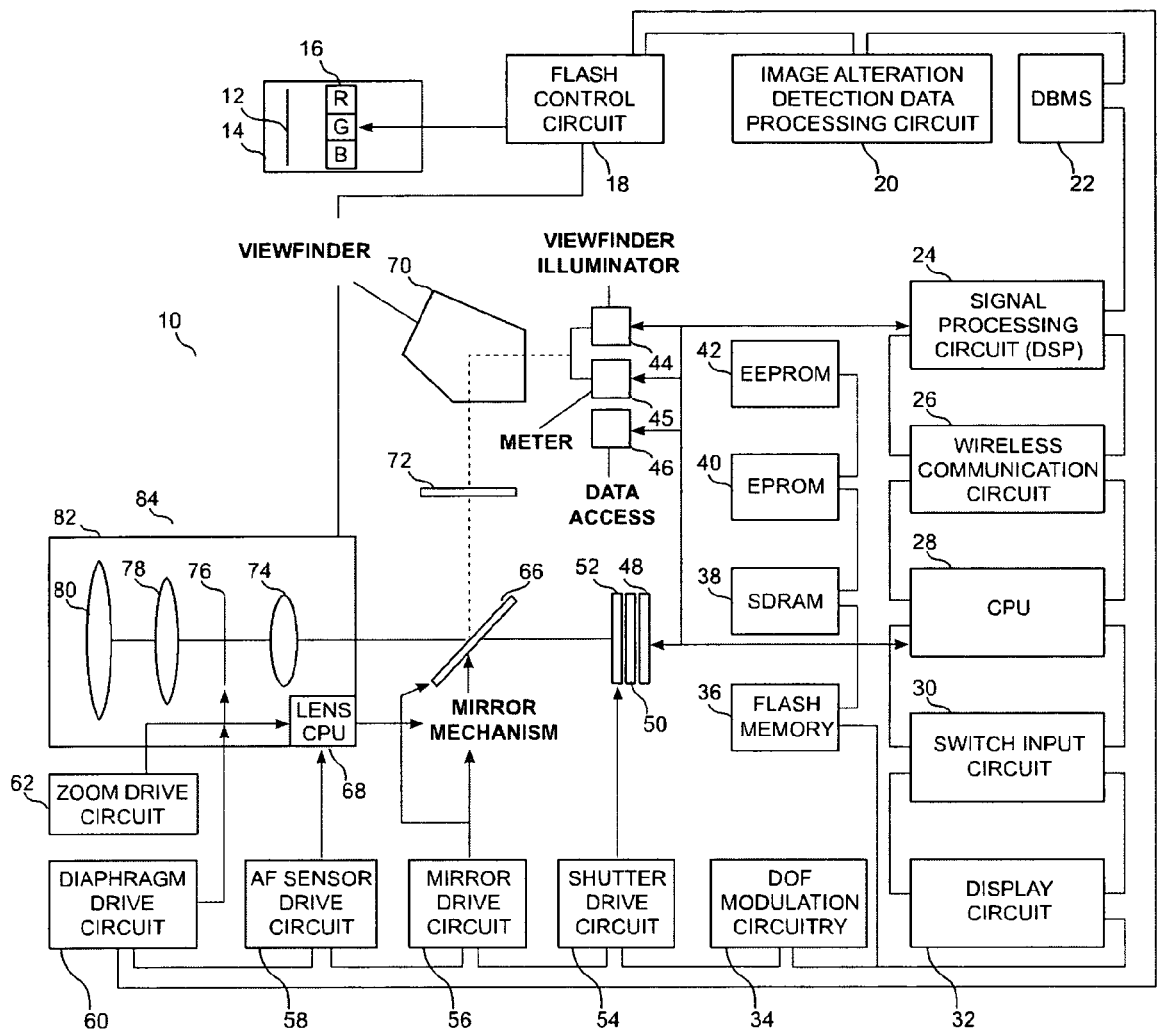
FIG. 1 is a schematic diagram of digital camera circuitry.

FIG. 1 shows the digital camera circuitry. The camera (10) consists of a housing with electronic circuitry to capture, process and store digital image files and a lens (84). The lens consists of a lens barrel (82), a set of lens groupings, including a front lens element (80), a middle lens element (78) and a rear lens element (74). The lens also includes a aperture diaphragm (76) and a lens CPU (68). In some cases, the lens includes at least one motor for autofocus. The lens may be a zoom lens or a fixed focal length lens. If the lens is a zoom lens, which provides a range of optical focal lengths, the lens includes a zoom drive circuit (62). The lens circuitry works in conjunction with the camera circuitry to maintain the aperture with a diaphragm drive circuit (60) and an autofocus sensor drive circuit (58).

In some, but not all cases, the camera contains a flash mechanism to provide artificial illumination. In FIG. 1, the flash mechanism is shown (14) with an illuminator (12) and a light apparatus (16) consisting of red, green and blue light functions. The flash mechanism is connected to a flash control circuit (18). In some cases, the flash mechanism is a separate apparatus that is attached to the camera device and is not internal to the camera.

The camera maintains a mirror in its single lens reflex (SLR) mode. In this case, the mirror mechanism (66) is operated by the mirror drive circuit (56). The mirror is in the down position in order to reflect light to a viewfinder (70) through a diaphragm (72) to allow the image from the lens to be viewed in the viewfinder. Not all embodiments of the invention, however, require a mirror mechanism. The viewfinder is illuminated (44) by a light in order to read information. Electronic data (46) is supplied to the user in the viewfinder, including the metering information provided by the camera metering system (45). The lens has a CPU (68) which may be a microprocessor or an SoC.

The camera uses a shutter apparatus (52), which is driven by a shutter drive circuit (54). When the mirror and the shutter are activated, light passes from the lens to the Bayer filter or anti-aliasing filter (50) and to the digital sensor (48). The digital image file is created by the digital sensor by converting photons to electrons. The image file is sent to either the signal processing circuit (DSP) (24) or the CPU (28). The image file is then sent to storage, typically a flash memory apparatus (36). In some cases, the image file is sent to an ASIC or cache for temporary storage before the DSP or CPU will process the file. In addition, the CPU may contain circuitry including an analog to digital converter, a digital to analog converter and a programmable gain amplification circuit. The CPU may be a microprocessor or a SoC.

In order to process the file, the CPU and DSP store data and instructions in EEPROM (42), EPROM (40), SDRAM (38) and DBMS (22) components, retrieve the data and instructions, process the file and send the processed file to storage. The system shows DOF modulation circuitry (34) to modulate the shutter speed, aperture, ISO and artificial illumination components. The aggregated camera circuitry may be contained in a single system on a chip (SoC) device, which integrates a set of microcircuits and memory devices with specific functionality.

The camera also uses a switch input circuit (30) to control the camera functions and an image alteration detection data processing circuit (20) to process the image. The image is viewed in a display, typically an LED or LCD on the back of the camera, which is controlled by a display circuit (32). The display circuit may contain its own DSP to process and filter image files. The camera also uses a wireless communication circuit (26) to communicate wirelessly with outside devices. The wireless circuit may be Wi-Fi (802.11 b/g/n), Bluetooth, 3G or 4G LTE. For example, the camera may upload image files to other devices or may download image files, software or algorithms from other devices. In another implementation, the camera may use USB 1.0, 2.0 or 3.0, Firewire or Thunderbolt communications connections.

Figure 2:
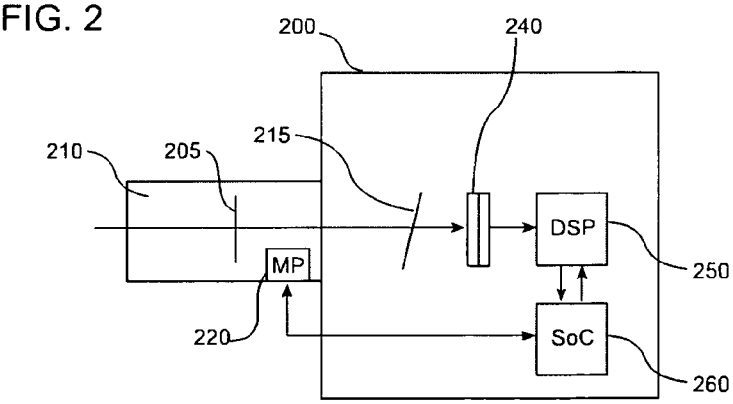
FIG. 2 is a schematic diagram of a camera and lens showing the interaction of camera SoC and lens MP to manipulate aperture.

FIG. 2 shows the interaction of a camera and lens showing the interaction of camera SoC and lens MP (or CPU) to manipulate lens diaphragm to control aperture settings. The lens (210), is shown with MP (220) and diaphragm (205). The camera (200), shown with mirror (215) and sensor (240) apparatuses, forwards an image file from the sensor to the DSP (250). The DSP accesses the SoC (260) to analyze the image file. The SoC sends an algorithm to the lens MP to modify the lens aperture. The camera captures images with the modified aperture setting to control image DOF.

FIGS. 3A, 3B, 3C and 3D show the slope of exposure outcomes based on multiple variables. In FIG. 3A, aperture and shutter speed are shown as the scales, with the constant exposure (300) along these variables. In FIG. 3B, ISO and aperture are shown as scales, with constant exposure (310) along these variables. In FIG. 3C, ISO and shutter sheep are shown as the scales, with the constant exposure (310) along these variables. In FIGS. 3A-3C, as one variable changes, the other changes inversely in order to maintain the same relative exposure. In FIG. 3D, three scales are shown in one graph (330). The aperture, shutter speed and ISO are shown in a three dimensional configuration in which the constant exposure would appear in a cubic orientation. As the aperture and shutter speed scales are inversely related, the ISO scale is inversely related to both scales so that a change in one will lead to an inverse change in the others.

FIG. 4 shows the process of using the camera SoC to modify the lens aperture to optimize image DOF. After the camera SoC modifies the exposure data to change the aperture setting by one or more stops (400), the camera SoC adjusts the SS or the ISO inversely to the aperture setting (410). The ISO is changed when there is limited light (420) and the camera SoC sends a signal to the lens MP to adjust aperture setting to the DOF preference (430). The camera focuses on the object and takes the picture (440) and a specific object is highlighted because of the DOF modulation (450).

FIG. 5 shows the process of optimizing DOF of an object in an image using a digital camera. Once the lens data are forwarded to the camera SoC by the lens MP (500), the lens focal length data are supplied to the camera SoC (510). The camera focuses on the object (520) and the distance data from the camera to the object are sent to the camera SoC (530). The camera computes at least two stops of narrowing of DOF for object (540) and the camera SoC sends a revised aperture setting to the lens MP (550). The lens changes aperture setting to narrow DOF (560) and the background and foreground around the object are blurred (570).

Figure 6:
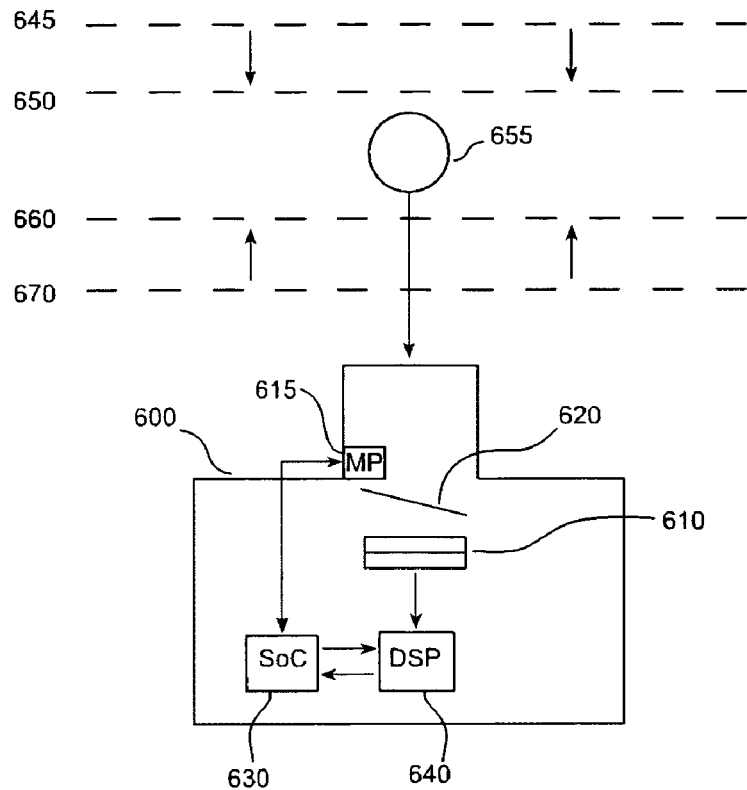
FIG. 6 is a schematic drawing showing how the image DOF is compressed with camera SoC and lens MP interaction.

FIG. 6 shows how the image DOF is compressed with camera SoC and lens MP interaction. The camera (600) is shown with mirror (620) and sensor (610) apparatuses. The image is of an object (655) is captured by the sensor and the image file is sent to the DSP (640). The DSP interacts with the SoC (630), which calculates the aperture and the shutter speed for the optimal DOF modulation of the object. The SoC interacts with the DOF modulation circuitry to determine optimal image DOF. The SoC communicates with the lens MP (615) in order to modulate the lens aperture. As the aperture changes to a wider open lens setting (f stop), the DOF from the background distance is moved from 645 to 650 and the DOF from the foreground distance is moved from 670 to 660. The opposite is also true as more DOF is provided for the object and the camera calculation of the aperture and shutter speed is modified to provide more depth and a smaller lens f stop. The lens MP (or SoC) uses the DOF modulation circuitry to perform the calculations.

Figure 7:
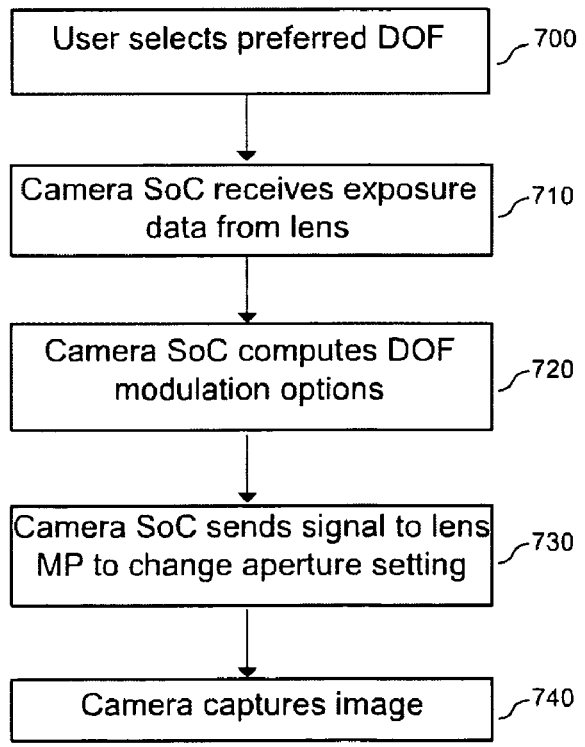
FIG. 7 is a flow chart showing the process of using a camera SoC to compute DOF options.

FIG. 7 shows the process of using a camera SoC to compute DOF options. After the user selects the preferred DOF (700), the camera SoC receives exposure data from the lens (710). The camera SoC computes DOF modulation options (720) and sends a signal to the lens MP to change the aperture setting (730). The camera then captures the image (740).

FIG. 8 shows the process of using a camera SoC to modify image DOF in successive images. After the user selects a preferred DOF (800), the camera captures an image (810). The camera SoC assesses the image DOF and sends a signal to the DSP (820), which sends a signal to the camera SoC to adjust aperture (830). The camera SoC then sends a signal to the lens MP to adjust aperture (840) and the lens MP adjusts lens aperture (850). In the next image after the image assessment, the lens adjusts the aperture (860) and the camera captures a modified image (870). The SoC accesses the DOF modulation circuitry to calculate optimal DOF and lens setting options. In one implementation, the SoC calculates the aperture adjustment without the DSP.

FIG. 9 shows the process of using a camera SOC to optimize image DOF by manipulating SS and ISO. Once the user specifies the DOF preferences (900), the lens focuses on an object (910) and the camera SoC analyzes the exposure data, the lens data and the distance data (920). The camera SoC determines a modified DOF for the object (930) and accesses a map of DOF in a database to evaluate optimal exposure variables to use to adjust the aperture (940). The user selects the preferred settings by comparing the cone of options in the DOF map (950) and the camera SoC sends a signal to the lens MP to change the aperture setting (960). The camera SoC adjusts the camera shutter speed and ISO to correspond to the selected combination of exposure variables (970) and the camera captures the image and processes the image file (980).

Figure 10:
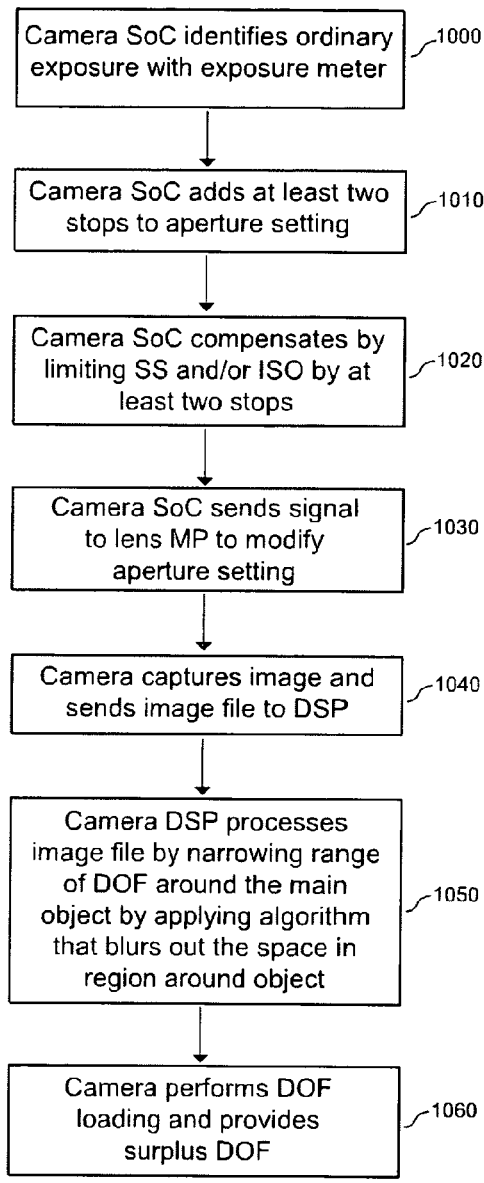
FIG. 10 is a flow chart showing the process of using a camera SoC to modify image DOF.

FIG. 10 shows the process of using a camera SoC to modify the image DOF. After the camera SoC identifies ordinary exposure with an exposure meter (1000), the camera SOC adds at least two stops to the aperture setting (1010). The camera SoC compensates by limiting shutter speed and/or ISO by at least two stops (1020). The camera SoC then sends a signal to the lens MP to modify the aperture setting (1030) and the camera captures the image and sends the image file to the DSP (1040). The camera DSP processes the image file by narrowing the range of DOF around the main object by applying an algorithm that blurs out the space in the region around the object (1050). The camera then performs the DOF loading and provides surplus DOF (1060). In one implementation, the camera constrains the DOF in order to allow an object to stand out from the background.

Figure 11:
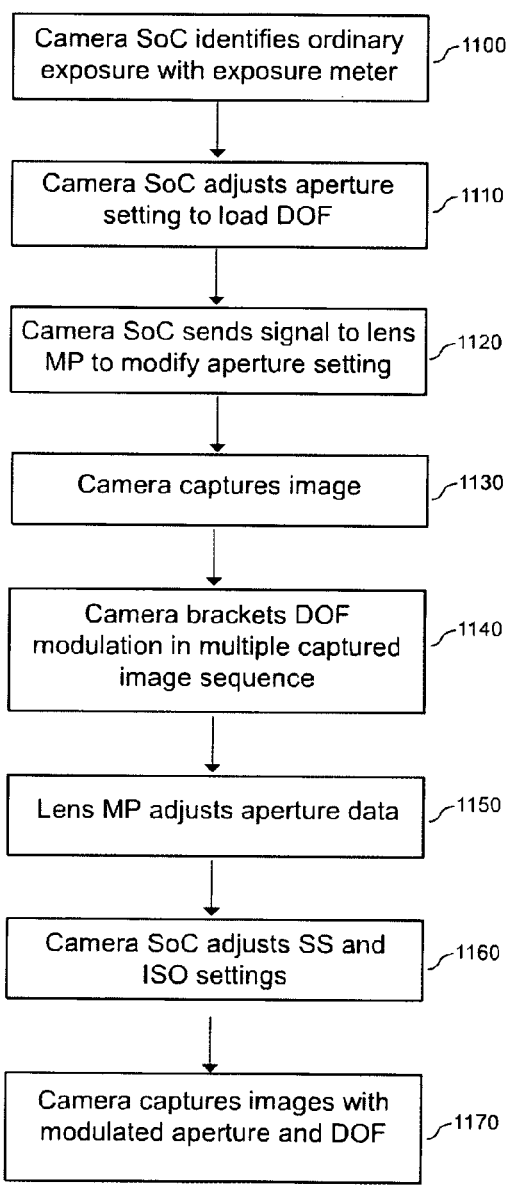
FIG. 11 is a flow chart showing the process of using a camera SoC to bracket images with DOF modulation.

FIG. 11 shows the process of using a camera SoC to bracket images with DOF modulation. Once the camera SoC identifies an ordinary exposure with its exposure meter (1100), the camera SoC adjusts the aperture setting to load DOF (1110). The camera SoC then sends a signal to the lens MP to modify the aperture setting (1120). The camera captures an image (1130) and the camera brackets the DOF modulation in a multiple captured image sequence (1140). The lens MP adjusts the aperture data (1150) and the camera SoC adjusts SS and ISO settings (1160). The camera captures successive images with the modulated aperture and DOF (1170).

FIG. 12 shows the process of using a camera SOC to modify image DOF by modulating aperture, SS and ISO to emulate the process of a lens tilt and shift. After the user specifies tilt and shift emulation priorities by focusing on different object points (1200), the different focus data are entered into the camera SoC (1210). The camera SoC uses exposure data from the camera meter to set image exposure (1220), the DSP applies an algorithm to modify the image DOF and sends the algorithm to the SoC (1230). The camera SoC modifies DOF by modulating aperture, SS and ISO settings (1240). The camera SoC modifies the focus point of the image (1250) and the camera captures the image with the modified setting (1260). The effect of this process is to allow the image to emulate the tilt and shift preferences (1270) of the user.

Figure 14:
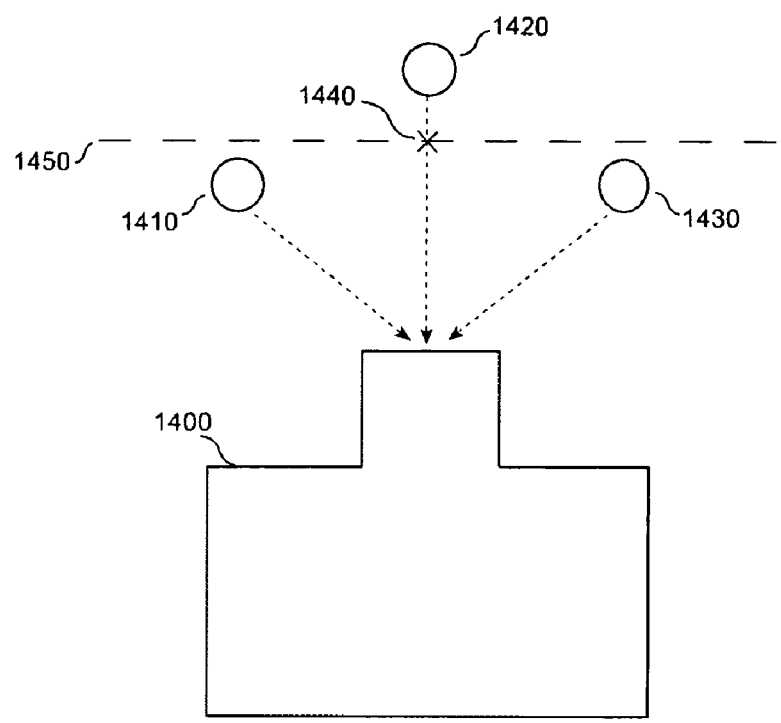
FIG. 14 is a schematic diagram showing the process of averaging the distance between objects so as to modulate the DOF of the objects.

FIG. 14 shows the process of averaging the distance between objects so as to modulate the DOF of the objects. The camera (1400) assesses the distance between the main objects (1410, 1420 and 1430) and averages the distance to a plane (1450) between the objects. The point (1440) that represents the average of the distance between the objects is then selected and the camera takes a picture focused on this point.

Figure 15:
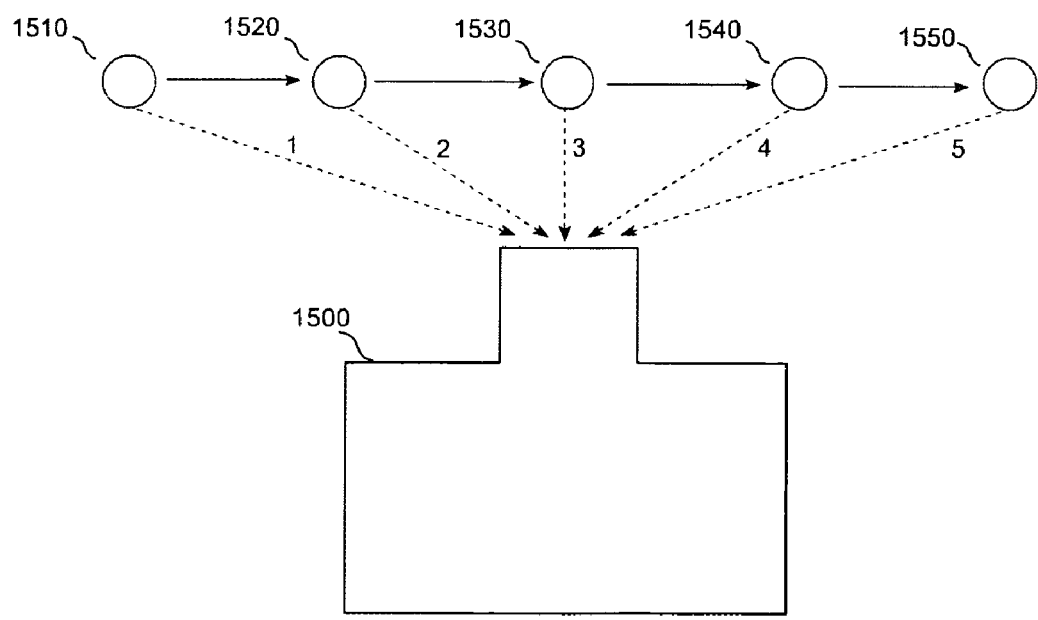
FIG. 15 is a schematic diagram showing the phases of tracking a moving object.

FIG. 15 shows the phases of tracking a moving object. The object moves from position 1 (1510) to position 2 (1520) to position 3 (1530) to position 4 (1540) to position 5 (1550). The camera (1500) tracks the object movement and calculates the distance between the camera and the object as the object moves towards the camera and then away from the camera. The distance data on the moving object are critical to provide information to use in the calculations of DOF.

Figure 16:
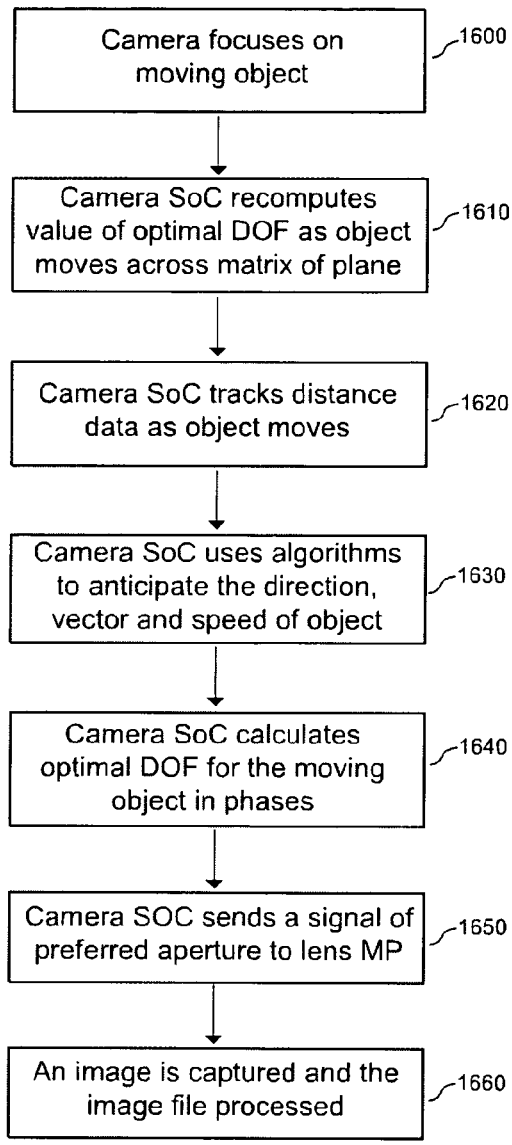
FIG. 16 is a flow chart showing the process of using a camera SoC to anticipate the movement of an object and calculate the optimal DOF of the object.

FIG. 16 shows the process of using a camera SoC to anticipate the movement of an object and calculate the optimal DOF of the object. After the camera focuses on a moving object (1600), the camera SoC re-computes the value of the optimal DOF as an object moves across a matrix of the plane (1610). The camera SoC tracks the distance data as the object moves (1620) and uses algorithms to anticipate the direction, vector and speed of the object (1630). The camera SoC calculates the optimal DOF for the moving object in phases (1640) and sends a signal of preferred aperture to the lens MP (1650). An image is then captured and the image file is processed (1660).

Figure 17:
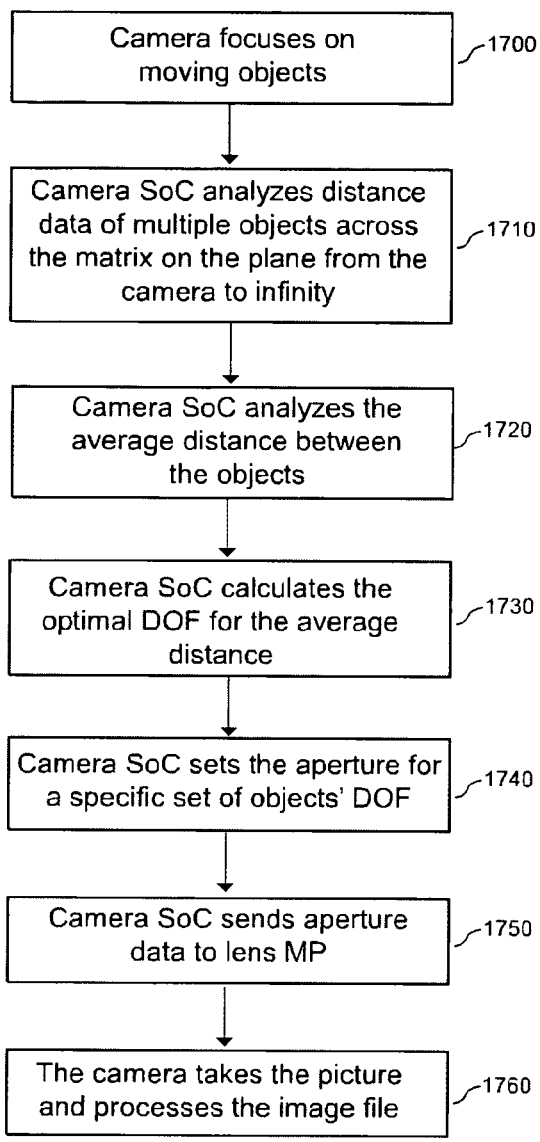
FIG. 17 is a flow chart showing the process of using a camera SoC to optimize DOF in an image with moving objects.

FIG. 17 shows the process of using a camera SoC to optimize DOF in an image with moving objects. After the camera focuses on moving objects (1700), the camera SoC analyzes distance data of multiple objects across the matrix on the plane from the camera to infinity (1710). The camera SoC analyzes the average distance between the objects (1720) and calculates the optimal DOF for the average distance (1730). The camera SoC then sets the aperture for a specific set of objects' DOF (1740) and sends the aperture data to the lens MP (1750). The camera takes the picture and processes the image file (1760).

Figure 18:
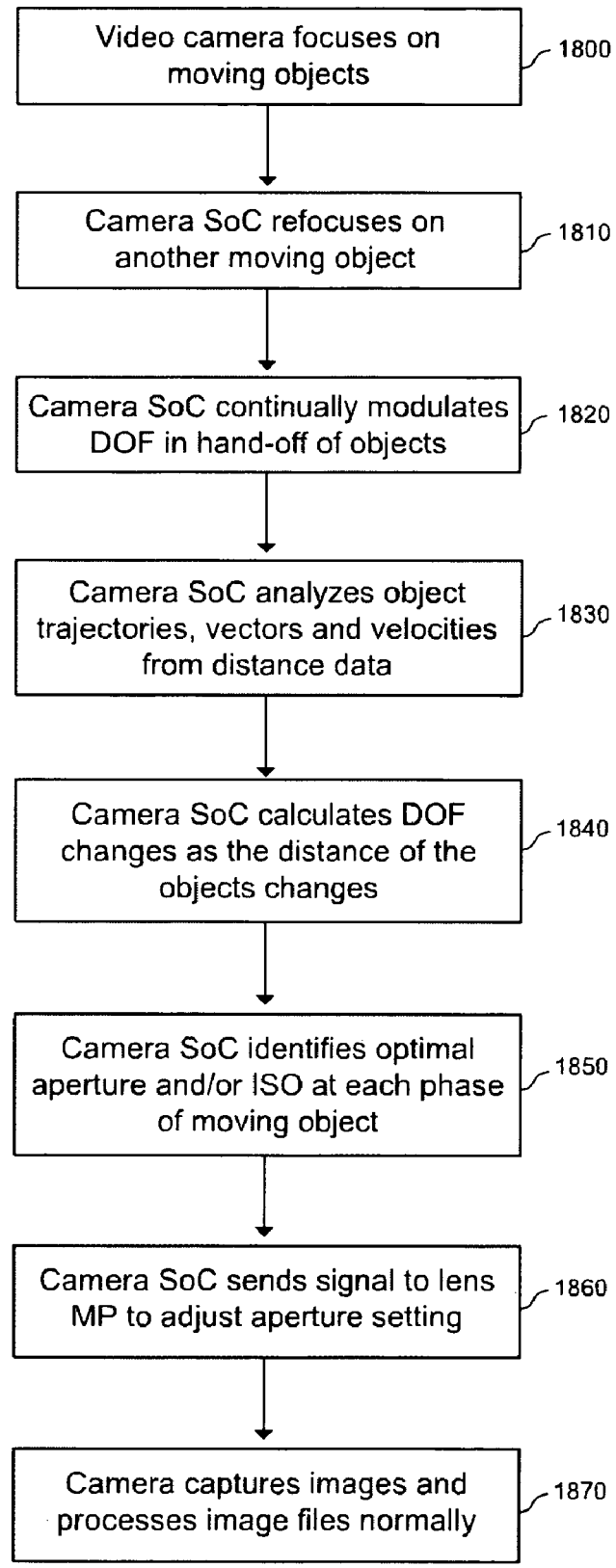
FIG. 18 is a flow chart showing the process of using a video camera SoC to modulate DOF in an image with multiple moving objects.

FIG. 18 shows the process of using a video camera SoC to modulate DOF in an image with multiple moving objects. Once the video camera focuses on moving objects (1800), the camera SoC refocuses on another moving object (1810). The camera SoC continually modulates the DOF in the hand-off of objects (1820) and the SoC analyzes object trajectories, vectors and velocities from distance data (1830). The camera SoC calculates DOF changes as the distance of the objects from the camera changes (1840). The camera SoC identifies optimal aperture and/or ISO at each phase of the moving object (1850) and the SoC sends a signal to the lens MP to adjust the aperture setting (1860). The camera captures the images and processes the image files normally (1870).

Figure 19:
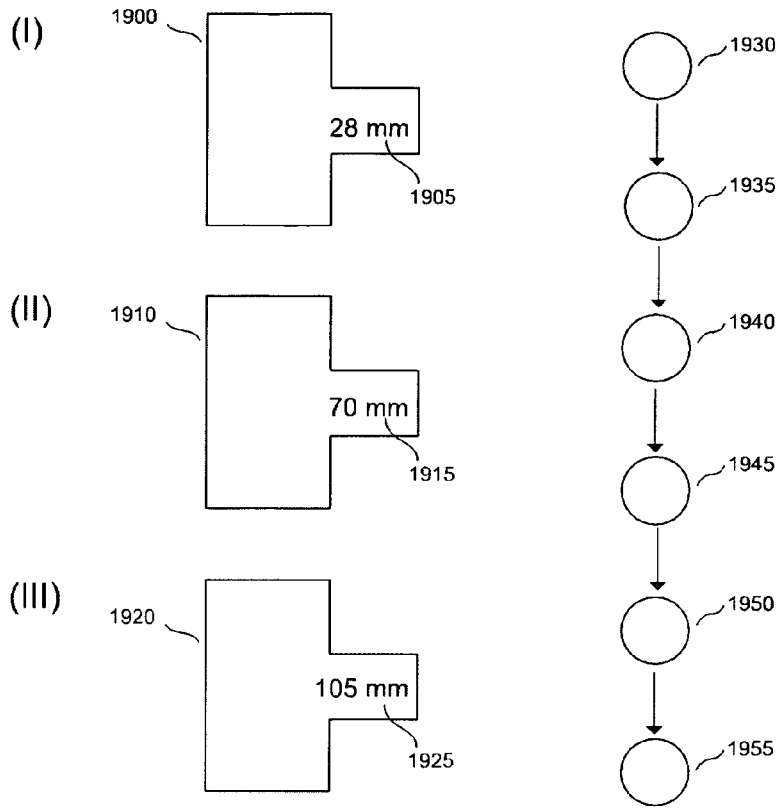
FIG. 19 is a schematic diagram showing the process of using a zoom lens with different focal length settings to modulate DOF in a moving object.

FIG. 19 shows the process of using a zoom lens with different focal length settings to modulate DOF in a moving object. On the right side, an object is seen moving from a position at 1930 to a position at 1955. In the first phase, the camera (1900) uses the zoom setting at focal length of 28 mm (1905). In the second phase, the camera (1910) uses the zoom setting at focal length of 70 mm (1915). In the third phase, the camera (1920) uses the zoom setting at focal length of 105 mm (1925). At each step, the zoom lens is changed to a longer focal length setting. Though this example shows the increase from a wide angle of view to a telephoto view, the system may also zoom out, i.e., zoom from telephoto position to wide angle position.

Figure 20:
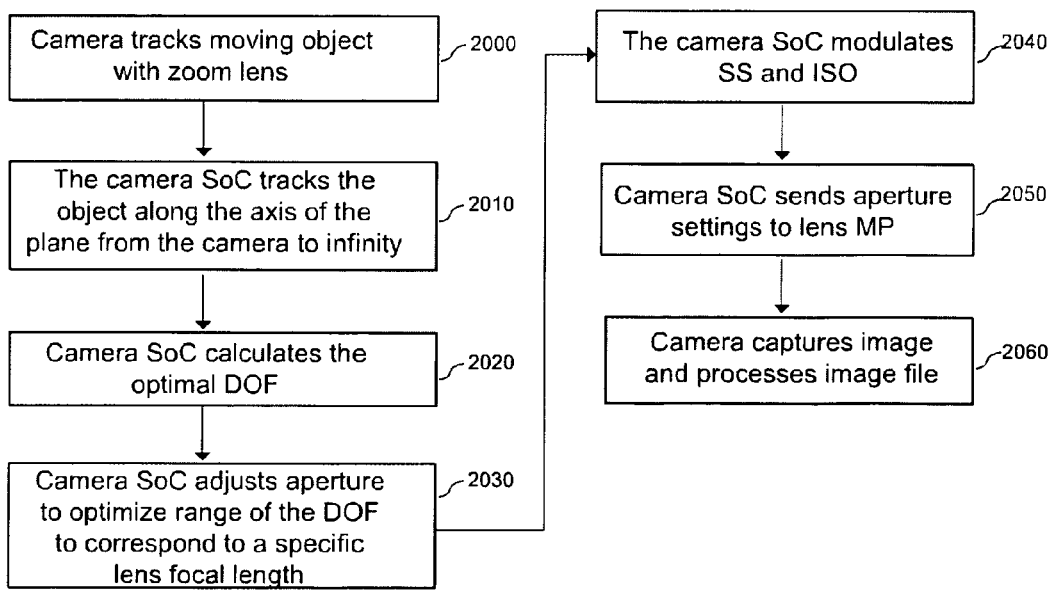
FIG. 20 is a flow chart showing the process of using a camera SoC to calculate optimal DOF of a moving object with a zoom lens.

FIG. 20 shows the process of using a camera SoC to calculate optimal DOF of a moving object with a zoom lens. After the camera tracks a moving object with a zoom lens (2000), the camera SoC tracks the object along the axis of the plane from the camera to infinity (2010). The camera SoC calculates the optimal DOF (2020) and adjusts the aperture to optimize a range of the DOF to correspond to a specific lens focal length (2030). The camera SoC modulates the SS and the ISO (2040) and sends the aperture settings to the lens MP (2050). The camera captures the image and processes the image file (2060).

Figure 21:
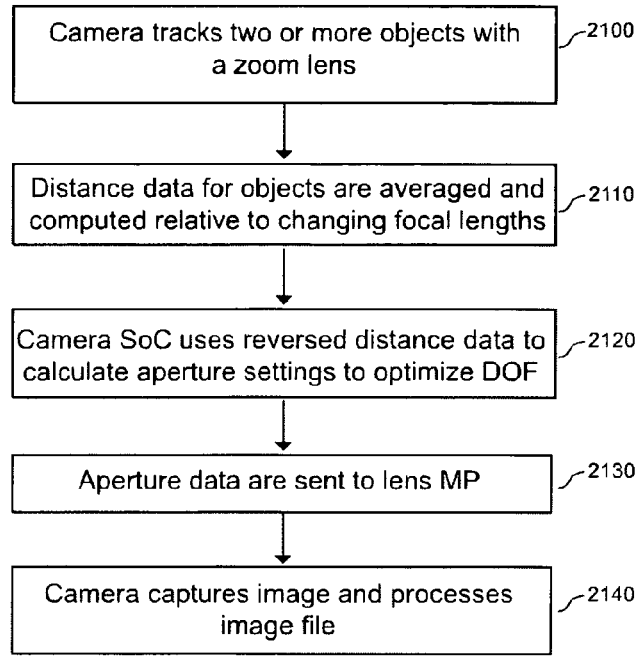
FIG. 21 is a flow chart showing the process of using a camera SoC to optimize DOF in an image with two or more objects with a zoom lens.

FIG. 21 shows the process of using a camera SoC to optimize DOF in an image with two or more objects with a zoom lens. After the camera tracks two or more objects with a zoom lens (2100), the distance data for objects are averaged and computed relative to changing focal lengths (2110). The camera SoC uses reversed distance data to calculate aperture settings to optimize DOF (2120). The aperture data are sent to the lens MP (2130), the camera captures the image and the image files are processed (2140) and stored.

Figure 22:
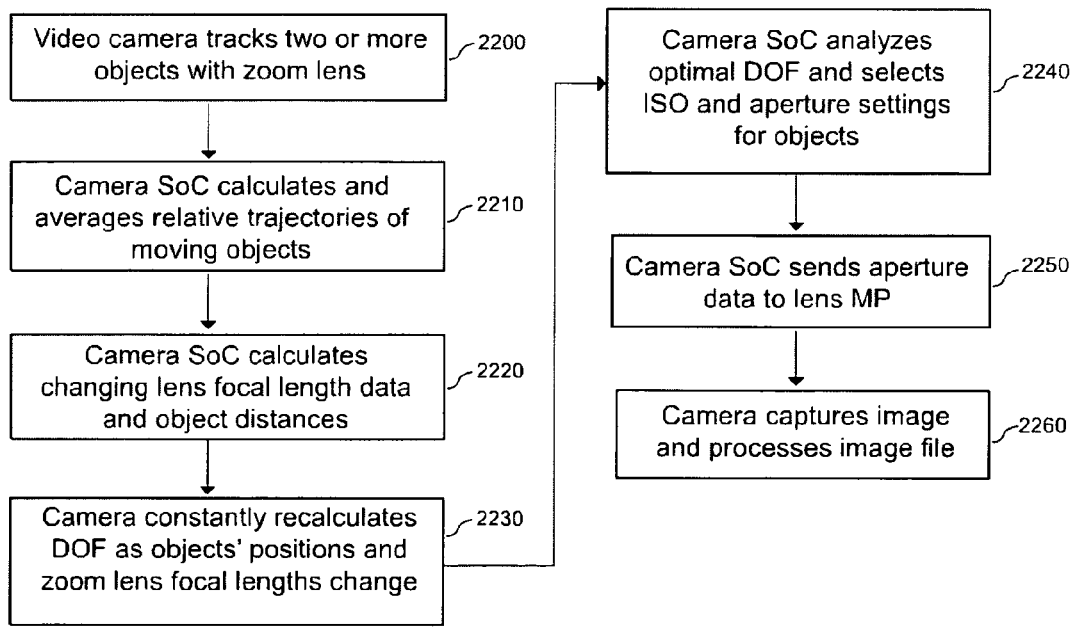
FIG. 22 is a flow chart showing the process of using a video camera SoC to optimize DOF in an image with two or more objects in a zoom lens.

FIG. 22 shows the process of using a video camera SoC to optimize DOF in an image with two or more objects in a zoom lens. After the video camera tracks two or more objects with a zoom lens (2200), the camera SoC calculates and averages relative trajectories of moving objects (2210). The camera SoC calculates the changing lens focal length data and object distances (2220). The camera constantly recalculates DOF as objects' positions and zoom lens focal lengths change (2230). The camera SoC then analyzes the optimal DOF and selects the ISO and aperture settings for objects (2240). The camera SoC sends the aperture data to the lens MP (2250), the camera captures the image and the image files are processed (2260) and stored.

Figure 23:
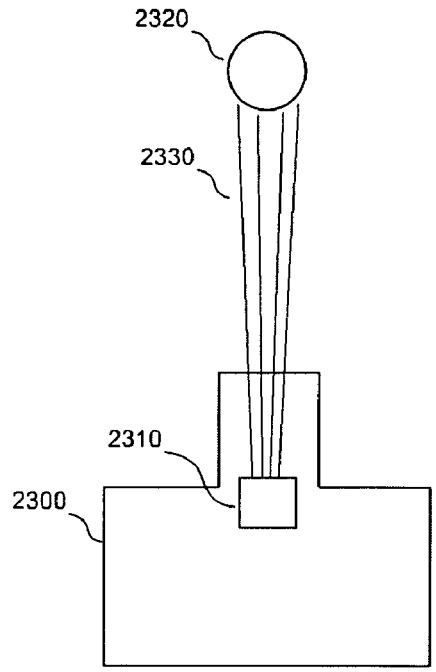
FIG. 23 is a schematic drawing illustrating a camera flash illuminating an object to manipulate DOF.

FIG. 23 shows a camera flash illuminating an object to manipulate DOF. The camera (2300) is shown with an artificial flash (2310). The flash shines an illumination (2330) on the object (2320). The use of artificial light allows the camera to manipulate the aperture, ISO and shutter speed to obtain an average exposure setting. DOF may be manipulated by using this fourth factor of artificial lighting. In one implementation, one or more flash units are used external to the camera and coordinated by the camera circuitry.

Figure 24:
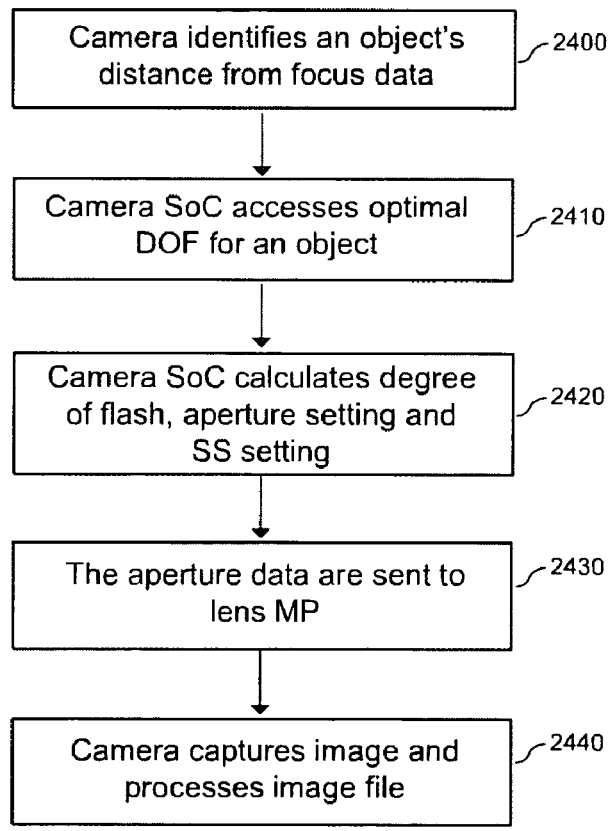
FIG. 24 is a flow chart showing the process of using a camera SoC to optimize image DOF with flash, aperture and shutter speed settings.

FIG. 24 shows the process of using a camera SoC to optimize image DOF with flash, aperture and shutter speed settings. Once the camera identifies an object's distance from the focus data (2400), the camera SoC accesses optimal DOF for an object (2410) and calculates the degree of flash, aperture setting and shutter speed setting (2420). The aperture data are sent to the lens MP (2430), the camera captures the image and the image file is processed (2440) and stored.

Figure 25:
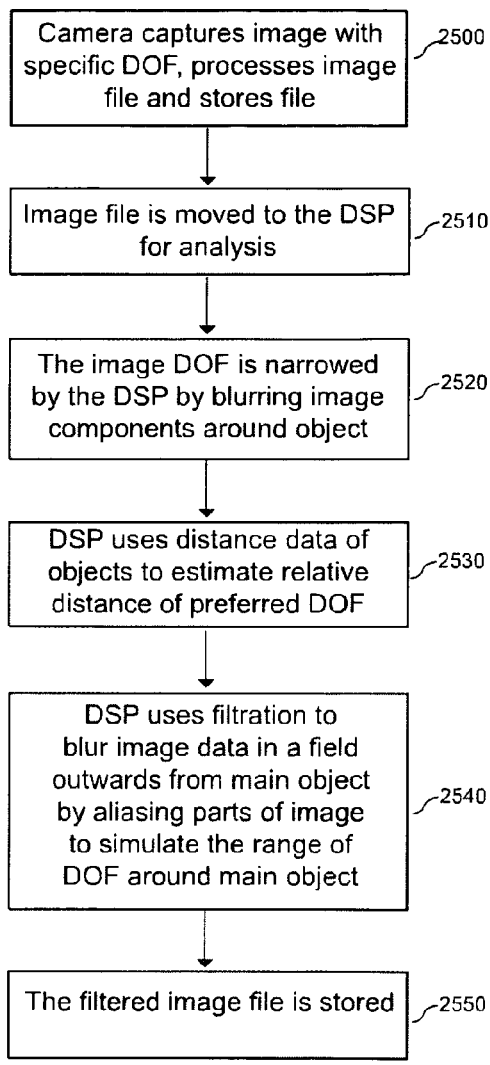
FIG. 25 is a flow chart showing the process of using a DSP to filter an image to optimize DOF.

FIG. 25 shows the process of using a DSP to filter an image to optimize DOF. The camera captures the image with a specific DOF, processes the image file and stores the file (2500). The image file is then moved to the DSP for analysis (2510). The image DOF is narrowed by the DSP by blurring image components around the object (2520). The DSP uses distance data of objects to estimate the relative distance of preferred DOF (2530). The DSP uses filtration to blur image data in a field outwards from the main object by aliasing parts of the image to simulate the range of DOF around the main object (2540). The filtered image file is then stored (2550).

Figure 26:
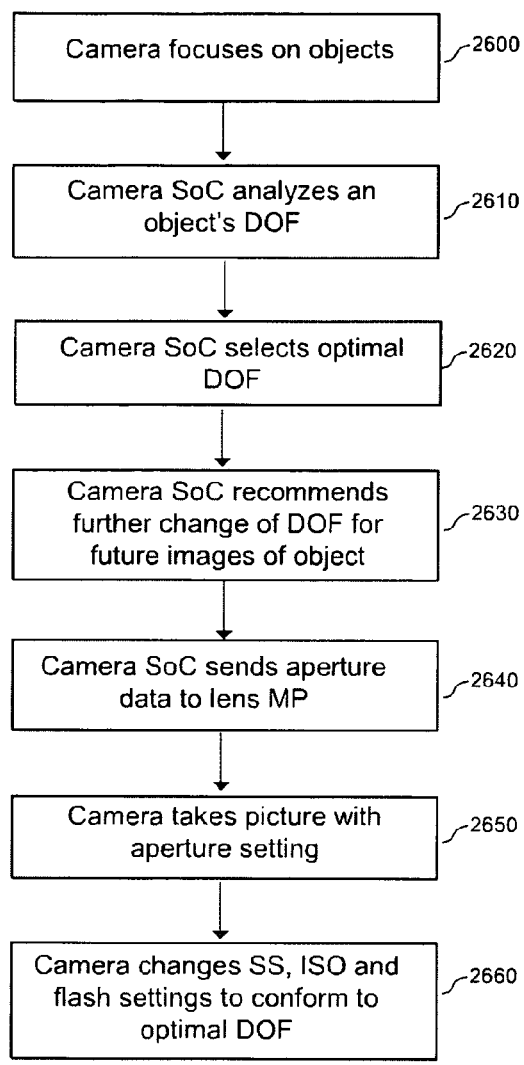
FIG. 26 is a flow chart showing the process of using a camera SoC to optimize image DOF with an aperture priority.

FIG. 26 shows the process of using a camera SoC to optimize image DOF with an aperture priority. Once the camera focuses on objects (2600), the camera SoC analyzes an objects' DOF (2610). The camera SoC selects optimal DOF (2620) and the camera SoC recommends further change of DOF for future images of object (2630). The camera SoC then sends aperture data to the lens MP (2640) and the camera takes a picture with the aperture setting (2650). The camera changes shutter speed, ISO and flash setting to conform to the optimal DOF (2660).

I claim:
1. A digital imaging system to modify image depth of field comprising:
   a digital camera mechanism, a digital sensor, a CPU, system software, a database management system, at least one digital signal processor (DSP), a flash mechanism and a memory storage sub-system;
   an optical lens mechanism that includes a lens aperture and a lens microprocessor to control the lens diaphragm;
   the camera CPU gathers exposure information on the image scene and distance information to the objects;
   the CPU accesses the database management system to assess depth of field (DOF) optimization in the digital image;
   the CPU selects an algorithm to optimize the DOF in the digital image by using the lens focal length data and data on the distance to at least one object;
   the CPU modifies the configuration of the lens diaphragm and sends the algorithm to the camera lens microprocessor modifying the lens aperture;
   the image is captured with the modified lens aperture and the modified camera shutter speed, ISO and/or flash settings optimizing the digital image DOF; and
   the DOF optimized digital image file is sent to the camera memory storage sub-system.

2. The system of claim 1:
   wherein the DOF is modified by increasing the lens aperture.

3. The system of claim 1:
   wherein the DOF is modified by decreasing the lens aperture.

4. The system of claim 1:
   wherein the lens mechanism is a single focal length lens.

5. The system of claim 1:
   wherein the lens mechanism is a zoom lens; and
   wherein the focal length of the zoom lens is specified.

6. The system of claim 1:
   wherein the user specifies the preferred DOF;
   wherein the camera CPU selects specific aperture data to optimize the image to correspond to the user selected DOF;
   wherein the aperture data is sent to the lens microprocessor to change the lens aperture setting; and
   wherein the camera captures the image with an optimized DOF.

7. A system for digital imaging system to modulate image depth of field comprising:
   a digital camera mechanism, a digital sensor, a CPU, system software, a database management system, at least one digital signal processor (DSP), a flash mechanism and a memory storage sub-system;
an optical lens mechanism that includes a lens aperture and a lens microprocessor to control the lens diaphragm;
the camera CPU gathers exposure information and on the image scene and distance information to at least one object;
the CPU accesses the database management system to assess depth of field (DOF) of the at least one object of the digital image;
the CPU selects at least one algorithm to optimize the DOF of the at least one object in the digital image by using the lens focal length data and data on the distance to at least one object;
the CPU uses the algorithm to modify the configuration of the lens diaphragm and sends the algorithm to the camera lens microprocessor;
the camera captures an image with a modified lens aperture and the modified camera shutter speed, ISO and/or flash settings optimizing the DOF of the at least one object in the digital image; and
the DOF optimized digital file is forwarded to the memory storage sub-system.

8. The system of claim 7:
wherein the camera CPU analyzes two or more objects;
wherein the camera CPU selects an optimum DOF for the two or more objects by averaging the distance between the objects and selects an algorithm;
wherein the camera CPU applies the algorithm to control the lens aperture and the camera shutter speed, ISO and/or flash based on user preferences; and
wherein the camera captures an image with DOF optimized for two or more objects.

9. The system of claim 7:
wherein the camera CPU analyzes at least one moving object;
wherein the camera CPU selects an optimum DOF for the at least one moving object at a specific point in space and time;
wherein the camera CPU selects and applies an algorithm to control the lens aperture and the camera shutter speed, ISO and/or flash based on user preferences; and
wherein the camera captures an image with DOF optimized for at least one moving object.

10. The system of claim 7:
wherein the optical lens mechanism is a zoom lens;
wherein the zoom lens is set to a specific focal length;
wherein the camera CPU selects an optimum DOF for the at least one object and selects an algorithm;
wherein the camera CPU applies the algorithm to control the lens aperture by sending the algorithm to the lens microprocessor;
wherein and the camera CPU applies the algorithm to control the shutter speed, ISO and/or flash based on user preferences; and
wherein the camera captures an image with DOF optimized for at least one object.

11. The system of claim 10:
wherein the zoom lens focal length is changed to a different specific focal length;
wherein the camera CPU selects an optimum DOF for the at least two objects by averaging distance data and selects an algorithm;
wherein the camera CPU applies the algorithm to control the lens aperture by sending the algorithm to the lens microprocessor wherein the camera CPU applies the algorithm to control the shutter speed, ISO and/or flash based on user preferences; and
wherein the camera captures an image with DOF optimized for two or more objects.

12. The system of claim 7:
wherein the camera is a digital video camera;
wherein the digital video camera captures a set of digital images in a sequence;
wherein the camera CPU selects an optimum DOF for the at least one object and selects an algorithm;
wherein the camera CPU applies the algorithm to control the lens aperture and the camera shutter speed and ISO based on user preferences; and
wherein the camera captures a video with DOF optimized for two or more objects in the sequence of images.

13. The system of claim 7:
wherein the camera is a digital video camera;
wherein the lens is a zoom lens;
wherein the zoom lens focal length modulates from one specific focal length to another specific focal length;
wherein the camera CPU selects an optimum DOF for the at least one object at a specific lens focal length;
wherein the digital video camera captures a set of digital images in a sequence;
wherein the camera CPU selects an optimum DOF for the at least one object and selects an algorithm;
wherein the camera CPU applies the algorithm to control the lens aperture and the camera shutter speed and ISO based on user preferences; and
wherein the camera captures a set of digital images with DOF optimized for one or more objects.

14. A method to modify image depth of field in a digital image which comprises:
a digital camera mechanism, a digital sensor, a CPU, system software, a database management system, at least one digital signal processor (DSP), a flash mechanism and a memory storage sub-system;
an optical lens mechanism that includes a lens CPU that configures the lens diaphragm;
wherein the depth of field (DOF) of the objects in the digital image file are modulated by using the camera CPU to control the camera shutter speed and ISO, a flash mechanism and/or the lens aperture, the method consisting of:
using the camera CPU to analyze an image scene in the camera viewfinder using the optical lens mechanism, such information including image exposure data and distance data to at least one object;
forwarding the information on the image scene to the CPU;
using the database management system in the CPU to assess depth of field (DOF) optimization of at least one object in the digital image;
selecting an algorithm to optimize the DOF in at least one object in the digital image by using the CPU and lens focal length data and data on the distance to at least one object;
applying the algorithm to modify the camera lens diaphragm by using the lens microprocessor;
activating the camera to capture an image with a modified lens aperture;
using the CPU to modify the camera shutter speed, ISO and/or flash in order to modify the at least one object DOF in the digital image;
optimizing the DOF of the at least one object in the digital image file; and forwarding the digital file to the camera memory storage sub-system.

15. The method of claim 14, further comprising:
Analyzing two or more objects using the camera CPU;
using the camera CPU to select an optimum DOF for the two or more objects and to develop an algorithm;
applying the algorithm in the camera CPU to control the lens aperture and the camera shutter speed and ISO based on user preferences; and
capturing an image in the camera with DOF optimized for two or more objects.

16. The method of claim 14, further comprising:
analyzing at least one moving object with the camera CPU;
selecting an optimum DOF with the camera CPU for the at least one moving object at a specific point in space and time;
selecting and applying an algorithm with the camera CPU to control the lens aperture and the camera shutter speed and ISO based on user preferences; and
capturing an image with the camera with DOF optimized for at least one moving object.

17. The method of claim 14, further comprising:
using a zoom lens configured to a specific focal length;
selecting an optimum DOF with the camera CPU for the at least one object and developing an algorithm;
applying the algorithm with the camera CPU to control the lens aperture and the camera shutter speed and ISO based on user preferences; and
capturing an image with DOF optimized for two or more objects.

18. The method of claim 17, further comprising:
changing the zoom lens focal length setting to a different specific focal length setting;
selecting an optimum DOF for the at least one object and developing an algorithm by using the camera CPU;
applying the algorithm to control the lens aperture and the camera shutter speed and ISO based on user preferences by using the camera CPU; and
capturing an image with DOF optimized for two or more objects.

19. The method of claim 14, further comprising:
using a digital video camera;
capturing a set of digital images in a sequence with the digital video camera;
selecting an optimum DOF using the camera CPU for the at least one object and developing an algorithm;
applying the algorithm using the camera CPU to control the lens aperture and the camera shutter speed and ISO based on user preferences; and
capturing a video with DOF optimized for two or more objects in the sequence of images.

20. The method of claim 14, further comprising:
using is a digital video camera using a zoom lens;
using the zoom lens to modulate from one specific focal length to another specific focal length;
selecting an optimum DOF using the camera CPU for the at least one object at a specific lens focal length;
capturing a set of digital images in a sequence using the digital video camera;
selecting an optimum DOF with the camera CPU for the at least one object and developing an algorithm;
applying the algorithm with the camera CPU to control the lens aperture and the camera shutter speed and ISO based on user preferences; and
capturing a set of digital images with DOF optimized for one or more objects.

* * * * *